US008565760B2

(12) United States Patent  (10) Patent No.: US 8,565,760 B2
Vanswol et al.  (45) Date of Patent:  Oct. 22, 2013

(54) METHODS, SYSTEMS AND APPARATUS FOR RECOVERING REGISTRATION INFORMATION

(75) Inventors: Steven E. Vanswol, Lombard, IL (US); Melissa D. Kasper, Streamwood, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 387 days.

(21) Appl. No.: 12/895,263

(22) Filed: Sep. 30, 2010

(65) Prior Publication Data

US 2012/0083266 A1  Apr. 5, 2012

(51) Int. Cl.
*H04W 4/00*  (2009.01)
*H04B 7/00*  (2006.01)
*H04K 1/00*  (2006.01)

(52) U.S. Cl.
USPC .............. 455/433; 455/432.1; 455/435.1; 455/519; 455/518; 380/274; 380/248

(58) Field of Classification Search
USPC ...... 455/433, 435, 519, 518, 432.1; 370/331; 380/297, 274, 248
See application file for complete search history.

(56) References Cited

U.S. PATENT DOCUMENTS

| 5,901,353 A | * | 5/1999 | Pentikainen | 455/433 |
| 6,480,715 B1 | * | 11/2002 | Pentikainen | 455/433 |
| 6,611,685 B1 | * | 8/2003 | Rune et al. | 455/433 |
| 7,133,672 B2 | * | 11/2006 | Sayeedi | 455/432.1 |

FOREIGN PATENT DOCUMENTS

| EP | 1030529 A2 | 8/2000 |
| WO | 9325051 A1 | 12/1993 |
| WO | 9404006 A1 | 2/1994 |
| WO | 0028772 A1 | 5/2000 |
| WO | 2008057472 A1 | 5/2008 |

OTHER PUBLICATIONS

International Search Report & Written Opinion for International Application No. PCT/US2011/050480 mailed on Dec. 12, 2011.

* cited by examiner

*Primary Examiner* — Opiribo Georgewill
(74) *Attorney, Agent, or Firm* — Steven A. May; Randi L. Karpinia

(57) ABSTRACT

Methods, systems and apparatus are provided for recovering registration information at a home network when the home network determines that it has experienced a loss of the registration information. The home network communicates a triggering message to at least one visited network to initiate registration information recovery, and the visited network responds to the triggering message by communicating registration information for objects that are located at the visited network and that are associated with the home network. These objects may include, for example, subscriber units and/or talk groups that are associated with the home network and have roamed to the visited network.

19 Claims, 9 Drawing Sheets

METHODS, SYSTEMS AND APPARATUS FOR RECOVERING REGISTRATION INFORMATION

FIELD OF THE DISCLOSURE

The present disclosure relates generally to interconnection of different wireless communication networks, and more particularly to recovering registration information at a server, such as a Home Radio Frequency Sub-System (HRFSS), when such registration information is lost and needs to be restored.

BACKGROUND

Wireless networks are prevalently used in the public safety sector (e.g., police, fire fighters, emergency workers, etc.). Such networks include, for example, Association of Public Safety Communications Officials (APCO) Project 25 (P25) compliant wireless networks, and those specified by the European Telecommunications Standards Institute (ETSI)'s digital wireless communication device (DMR) Tier-2 Standard.

P25 standards are produced through the joint efforts of the Association of Public Safety Communications Officials International (APCO), the National Association of State Telecommunications Directors (NASTD), selected Federal Agencies and the National Communications System (NCS), and standardized in specifications issued by the Telecommunications Industry Association (TIA), standard committee TR-8. Further details regarding the P25 standards can be obtained from the Telecommunications Industry Association, 2500 Wilson Boulevard, Suite 300 Arlington, Va. 22201. P25 specifies to a suite of narrowband digital Land Mobile Radio (LMR) communication standards for digital radio communications, equipment and systems. The P25 TIA series of documents (TIA-102) describe an open architecture for Public Safety mission critical digital radio communications. The goal of Project 25 (P25) is to provide an open standard that enables multiagency or regional LMR interoperability.

The ETSI DMR Tier-2 Standards have been and are currently being developed by ETSI, and any of the DMR standards or specifications referred to herein may be obtained by contacting ETSI at ETSI Secretariat, 650, route des Lucioles, 06921 Sophia-Antipolis Cedex, FRANCE.

The APCO P25 standards for digital two-way radio technology and the ETSI DMR Tier-2 standards are incorporated by reference herein in their entirety.

Within a P25 network or system there are a number of standardized interfaces. For example, the P25 standards specify a Common Air Interface (CAI) and related trunking standards provide for interoperability on a subscriber unit level. Among other things, the CAI defines the type and content of signals transmitted by P25-compliant radios. For instance, Project 25 Phase I compliant communication systems implement an FDMA-based channel access scheme, whereas Project 25 Phase II compliant communication systems implement a TDMA-based channel access scheme.

The public safety sector has recognized the need of connecting different Radio Frequency Sub-System (RFSS) together to form a larger network with a much larger coverage. Based on this need, the TIA TR8 committee has also developed the Intra-Radio Frequency (RF) Sub-Systems Interface (ISSI). The ISSI is defined in TIA-102.BACA-A, January 2009, and several addendums and other documents. TIA-102.BACA-A, January 2009 specifies the ISSI Messages and Procedures for Voice and Mobility Management Services. The ISSI is a non-proprietary multi-channel digital interface that specifies protocols having the capabilities needed to interconnect two or more core P25 radio networks (e.g., built by different manufacturers) together into one or more wide-area networks (WANs). The core P25 radio networks are called Radio Frequency Sub-Systems (RFSSs). The ISSI gives system designers the flexibility to combine any number of radio frequency sub-systems of any size. For example, the ISSI will allow network administrators to connect to other local, regional, statewide or federal networks. The ISSI supports standard Internet Protocol (IP)-based protocols for the transport of information to enable interoperability for different radio frequency sub-systems and to provide a common meeting place for radio frequency sub-systems of different technologies (Time Division Multiple Access (TDMA), Frequency Division Multiple Access (FDMA), micro-cell) and different RF bands. For example, the call signaling protocol is based on Session Invitation Protocol (SIP), which is specified in the Internet Engineering Task Force (IETF) Request For Comments (RFC) 3261, while the voice traffic and push-to-talk control messages are carried through the use of Real Time Protocol (RTP), which is specified in RFC 3550.

The wide area network connections using the ISSI provide an extended coverage area for subscriber units (SUs) that are roaming. For example, the ISSI performs mobility management functions and procedures to allow roaming (mobility) of subscriber units between radio frequency sub-systems. For instance, the ISSI supports the messaging and procedures necessary to enable radio frequency sub-systems to track and locate subscriber units, set-up and teardown calls and transfer voice information to the subscriber units. The ISSI uses standardized protocols (e.g., SIP and RTP protocols) to provide the messaging between radio frequency sub-systems. This allows subscriber units from a home radio frequency sub-system (HRFSS) to operate at another serving radio frequency sub-system (SRFSS) as if the subscriber units were operating in their HRFSS. The extended coverage area is important, for instance, to public safety first responders that provide assistance in other jurisdictions during an emergency.

In P25 systems, each radio frequency sub-system maintains a registration database. The registration database includes subscriber unit registration information that identifies which radio frequency sub-system(s) particular subscriber unit identifiers (SUIDs) are currently authorized to be registered with, the home radio frequency sub-system for each subscriber unit ID, and talk group (TG) registration information that identifies a HRFSS for each talk group, and other radio frequency sub-system(s) that talk groups (TGs) that are currently authorized to be registered with. A talk group is registered with a radio frequency sub-system if one or more subscriber units that are registered with that radio frequency sub-system belong to the talk group, and the HRFSS of that talk group has authorized registration of the talk group at that radio frequency sub-system. A SRFSS registers subscriber units/talk groups with a HRFSS so that subscriber units that are registered with the SRFSS can continue to receive calls from the HRFSS after the subscriber units roam to the SRFSS. For example, a SRFSS would register a subscriber unit/talk group with its HRFSS so that the HRFSS knows that it should forward any calls that originate in the HRFSS and are intended for that subscriber unit (or for a talk group that the subscriber unit belongs to) to the SRFSS so that the "roamed" subscriber unit will continue to receive calls.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
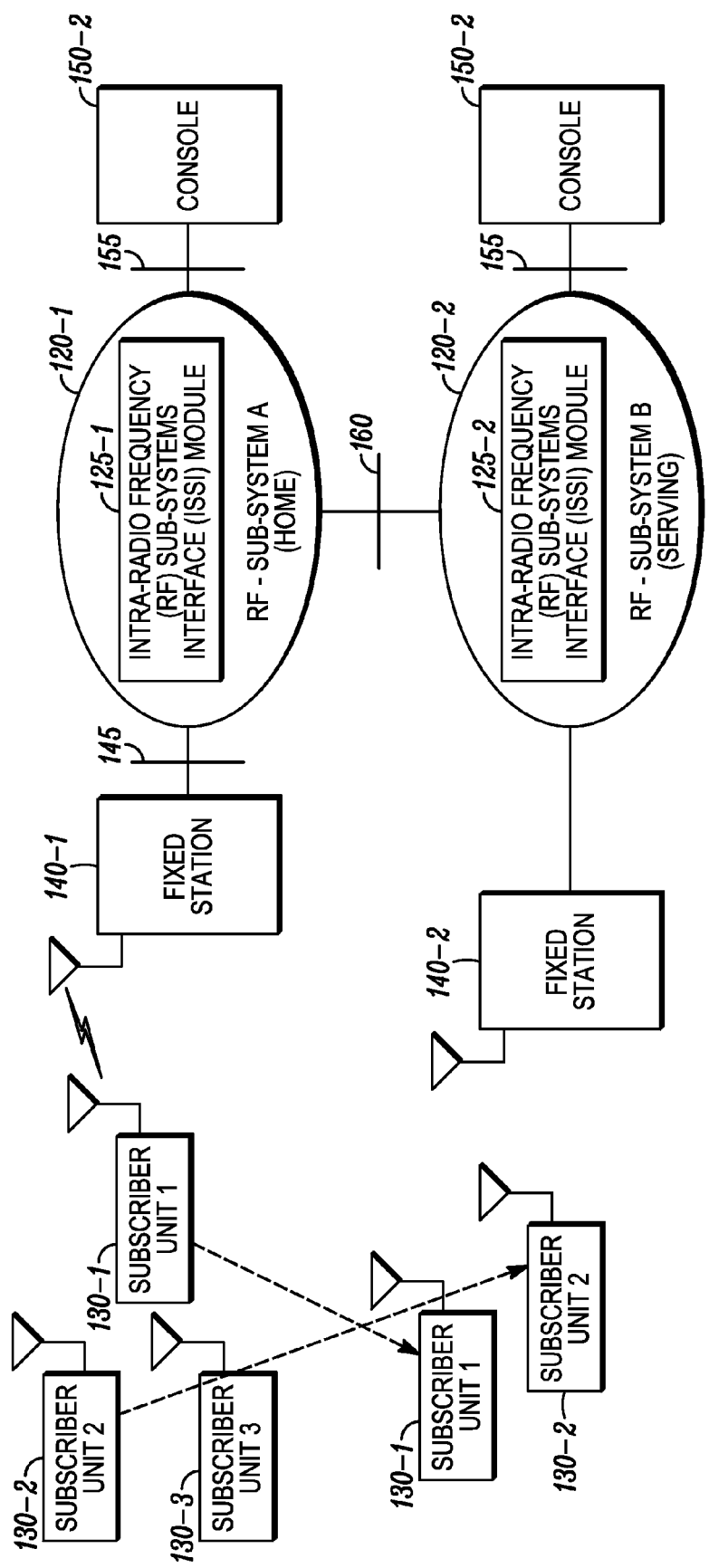
FIG. 1 is a communication system in which various embodiments of the present invention can be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments described herein so as not to obscure the disclosure with details that will be readily apparent to those of ordinary skill in the art having the benefit of the description herein.

DETAILED DESCRIPTION

When a HRFSS fails for some reason, subscriber unit and talk group registration information in their registration database can be lost. Without knowledge of which subscriber units and talk groups have been registered at other SRFSS(s), the HRFSS is unable to forward calls to a current SRFSS for those subscriber units. In other words, any calls to those "roamed" subscriber units would not be sent to the current SRFSS, and the roamed subscriber units would necessarily miss those calls. As such, it would be desirable to provide methods, systems and apparatus for recovering registration database information at a HRFSS so that the registration status of subscriber units and/or talk groups that are "homed" to that HRFSS can be restored in the event it is lost. Accordingly, there is a need for improved methods, systems and apparatus for recovering registration information at a HRFSS so that the HRFSS can restore its registration database in the event it is lost or fails for some reason.

The ISSI standard (TIA-102.BACA-A) defines methods for a HRFSS to query one or more SRFSS(s) for the registration status of individual subscriber units and talk groups that were registered at SRFSSs. Additionally the ISSI standard specifies that if a HRFSS sends a de-registration request to the SRFSS, and the SRFSS is still interested in either a subscriber unit or talk group that is the subject of the de-registration request, then the SRFSS may re-register the object with the HRFSS subject to its local policy.

Thus, one possible method to recover the registration status of individual subscriber units and talk groups that were authorized for registration with an SRFSS by the HRFSS (before failure) is for the HRFSS to send home queries or de-registration requests for each individual subscriber unit or talk group. However, the HRFSS must send individual queries (or de-registration requests) to the SRFSS for each individual subscriber unit or for each individual talk group. This process is very processor intensive and generates a lot of network traffic since individual queries (or de-registration requests) must be sent on an individual ID basis to obtain the registration status of each individual subscriber unit or each individual talk group. Moreover, this would require that the HRFSS have knowledge of identifiers for the particular subscriber units or talk groups that it wants to send a query or de-registration request about. This is not an option when the HRFSS loses its registration database information since there is no way to identify the subscriber units or talk groups that the HRFSS is querying (or submitting de-registration requests) about. In other words, both of these procedures require knowledge of the objects which were formerly registered, and neither provides an efficient mechanism for recovering registration information following a failure of the HRFSS.

The ISSI standard also provides a means to detect failure of a peer radio frequency sub-system via a radio frequency sub-system service capability polling procedure, potentially allowing a SRFSS to detect that re-registration may be needed. However, due to the polling duration plus the length of a SIP procedure (including retries) it is possible for the HRFSS to recover prior to the SRFSS confirming the fault and realizing that such recovery procedures are needed.

Thus, it would be desirable to provide improved methods, systems and apparatus for recovering registration database information at the HRFSS regarding the registration status of subscriber units and talk groups that were registered at one or more SRFSS(s) before the failure of the HRFSS.

In accordance with the disclosed embodiments, methods, systems and apparatus are provided for recovering registration database information at a HRFSS when the HRFSS determines that it has experienced a loss of the registration information (e.g., as a result of failure of the HRFSS). The registration database information is information regarding the registration status of objects, such as subscriber units and/or talk groups, that were authorized registration at one or more SRFSSs by the HRFSS before failure of the HRFSS. The HRFSS communicates a single system-wide triggering message (e.g., a registration query message or a de-registration request message) to at least one SRFSS to initiate registration information recovery. The triggering message allows a HRFSS to obtain registration information for all objects, such as all subscriber units or all talk groups, from the SRFSS(s) that receive the triggering message. The SRFSS(s) responds to the triggering message by communicating registration information for objects (e.g., subscriber units and/or talk groups) that are associated with the home network and have roamed to the visited network. In some implementations, the triggering message triggers re-registration of subscriber units (that have roamed to the SRFSS) with the HRFSS. When the HRFSS obtains the registration information from the SRFSS, the registration information can be used to restore the registration database at the HRFSS.

In one implementation of the disclosed embodiments, an interface module (e.g., an ISSI module) is provided for system comprising a home network, a visited network coupled to the home network, and subscriber units associated with the home network that have roamed to the visited network. The interface module may comprise a mobility management module that generates a triggering message to initiate registration information recovery. The interface module receives, in response to the triggering message, registration information from the visited network. In one implementation, the registration information may comprise: identifiers for the subscriber units that are located at the visited network and that are associated with the home network, or identifiers for talk groups that are registered at the visited network and that are associated with the home network.

FIG. 1 is a communication system 100 in which various embodiments can be implemented. The communication system 100 illustrated is a conventional trunked two-way radio communication system 100.

According to some embodiments, the techniques described above can be used in radio communication systems, such as those specified by the APCO Project 25 (P25) standards for digital two-way radio technology. P25 compliant radios can communicate directly with each other in "talk around" mode without any intervening equipment between two radios, or in conventional mode where a requesting radio chooses the channel to talk on and two radios communicate through a fixed station without trunking. According to other embodiments, the techniques described above can be used in radio communication systems, such as those specified by the ETSI's DMR Tier-2 Standard.

The communication system 100 includes a plurality of subscriber units (SUs) 130, a plurality of fixed stations (FSs) 140, a plurality of radio frequency sub-systems 120 and a plurality of consoles 150. For ease of illustration, three subscriber units 130 and two FSs 140 are shown. However, those skilled in the art will appreciate that a typical system can include any number of subscriber units and any number of FSs distributed about in any configuration. For example, in some implementations, it is sometimes common to have hundreds or thousands of subscriber units that "belong to" or "are associated with" a particular home radio frequency sub-system. Moreover, each radio frequency sub-system 120 may have more than one FS 140 coupled to it. The communication system 100 can also include other networked apparatus and devices that are not illustrated for sake of convenience.

The system 100 comprises a plurality of communications devices such as the illustrated subscriber units 130, which may be, for example, a portable/mobile radio, a personal digital assistant, a cellular telephone, a video terminal, a portable/mobile computer with a wireless modem, or any other type of wireless communication device. For purposes of the following discussions, the communication devices will be referred to as "subscriber units," but they are also referred to in the art as wireless communication devices, mobile stations, mobile equipment, handsets, mobile subscribers, or an equivalent.

SUs 130 can communicate with the fixed stations 140 over wireless communication links that comply with a P25 standard Common Air Interface (CAI) standard as is well-known to those skilled in the art. The P25 standard's CAI specifies the type and content of signals transmitted by compliant radios. The CAI allows P25 compliant subscriber units from different vendors to communicate with each other (either in talk-around mode or in indirect mode via a fixed stations) if they support the same frequency band. The CAI also allows radios from different P25 systems to be used on other P25 networks (if authorized and in the same frequency band) even if subscriber units and the network infrastructure come from different vendors.

The FSs 140 may also be referred to as base stations, base radios, repeaters, access points, etc. The FSs 140 include at a minimum a repeater and a router and can also include other elements to facilitate the communications between subscriber units 130 and the radio frequency sub-systems 120. It will be appreciated by those of ordinary skill in the art that the FSs 140 and subscriber units 130 can be, for example, part of a wide area network (WAN) that is distributed over a wide area that spans multiple access networks.

In some implementations, the subscriber units 130 can communicate with each other through FSs 140. As is known by one of ordinary skill in the art, a FS generally comprises one or more repeater devices that can receive a signal from a transmitting subscriber unit over one wireless link and re-transmit to listening subscriber units over different wireless links. For example, subscriber unit 130-1 can transmit over one wireless link to FS 140-1 and FS 140-1 can re-transmit the signal to listening subscriber units 130-2, 130-2 over another wireless link. In addition, subscriber unit 130-1 may communicate with the other subscriber units at other sites. Moreover, in some implementations the subscriber units 130 can communicate directly with each other when they are in communication range of each other using a direct mode of operation without assistance of a FS 140.

Since network 100 is a wireless network the subscriber units 130 and the FSs 140 comprise transceivers that include a transmitter and a receiver for transmitting and receiving radio frequency (RF) signals, respectively. Typically, both the subscriber units 130, and the FSs 140, further comprise one or more processing devices (such as microprocessors, digital signal processors, customized processors, field programmable gate arrays (FPGAs), unique stored program instructions (including both software and firmware), state machines, and the like.) and non-transitory memory elements for performing (among other functionality) the air interface protocol and channel access scheme supported by network 100. As will be described below, using these protocols, subscriber units 130 can each generate RF signals that are modulated with information for transmission to the other subscriber units or the FSs.

Preliminarily, it is noted that a radio frequency sub-system can have at least one of two functional roles, and can be called a home radio frequency sub-system (HRFSS) or a serving (or "foreign") radio frequency sub-system (SRFSS) depending on its status with respect to a particular subscriber unit or a particular talk group.

The HRFSS usually represents the normal location and radio coverage area under which a particular talk group and/or individual subscriber unit operates. The HRFSS manages activities of a particular talk group, and can make decisions regarding its "homed" subscriber units, homed talk groups and calls to those subscriber units or talk groups.

By contrast, the SRFSS normally represents a foreign location and radio coverage area that is not the HRFSS of a particular subscriber unit or talk group.

In some scenarios, the SRFSS role can also be defined by its relationship to an object such as a talk group or subscriber unit. The SRFSS can be, for example, a radio network to which a talk group (or certain member subscriber units of a talk group) and/or individual subscriber unit has roamed. This way a subscriber unit or subscriber units that belong to a particular talk group can roam from their HRFSS to other SRFSSs and maintain communication via their HRFSS. For instance, when a user of a talk group requests the floor, i.e.

permission to talk to the other group members, the SRFSS will forward the request to the HRFSS using the ISSI protocol. The HRFSS will arbitrate any received requests and award the floor to a "winning" user. Conversely, when the HRFSS also receives voice traffic from a SRFSS, the HRFSS can forward it to other radio frequency sub-systems.

In other scenarios, an SRFSS can also be used to interoperate with other radio frequency sub-system(s) so that home subscriber units of a radio frequency sub-system (that is designated as the SRFSS) can communicate with other subscriber units in other radio frequency sub-system(s) including subscriber units in an HRFSS. For example, two neighboring radio frequency sub-systems may want to have shared groups for incidents (e.g., large fires) that require both radio frequency sub-systems. In this scenario one of the two radio frequency sub-systems will be picked as the HRFSS for those groups (on a group by group basis), and the other will be designated as the SRFSS. In this scenario, although no subscriber units are roaming, one radio frequency sub-system can be designated as the SRFSS, and will interoperate with other radio frequency sub-system(s) so that home subscriber units of the SRFSS can communicate with other subscriber units in other radio frequency sub-system(s). In some instances, an SRFSS may be purely a logging device, recording voice traffic and/or data procedures for a set of SUs/talk groups.

In FIG. 1, the radio frequency sub-system 120-1 is the HRFSS that supports subscriber units 130-1, 130-2, 130-3. The subscriber units 130-1, 130-2 eventually roam or migrate to radio frequency sub-system 120-2 and register with radio frequency sub-system 120-2. At this point, radio frequency sub-system 120-2 becomes the serving radio frequency sub-system for subscriber units 130-1, 130-2. As such, in the particular example illustrated in FIG. 1, radio frequency sub-system 120-1 will be designated as the HRFSS and radio frequency sub-system 120-2 will be designated as the SRFSS for sake of clarity; however, their roles can be reversed depending on the implementation and relationship to subscriber units that are present. As will be appreciated by those skilled in the art, the functional roles of the home and SRFSS can be expanded to include whether the HRFSS or SRFSS is either the "calling" radio frequency sub-system or "called" radio frequency sub-system for subscriber unit-to-SU voice calls, and the possible combinations of the function roles for a radio frequency sub-system depend on many factors (e.g., network topology and configuration), as well as what type of voice service is being provided. Furthermore, it is noted that depending on the implementation the HRFSS 120-1 and the SRFSS 120-2 can be either part of the same P25 System (intra-system) or in different P25 Systems (inter-system) within a Wide Area Network (WAN).

Each fixed station 140 is coupled to a radio frequency sub-system 120 via a Fixed Station Interface (FSI) 145 designed to facilitate integration of fixed stations and the radio frequency sub-system. Although FIG. 1 illustrates that each radio frequency sub-system 120 is coupled to a single FS 140, those skilled in the art will appreciate that each radio frequency sub-system 120 can be (and usually is) coupled to more than one FS 140. Each radio frequency sub-system 120 can also be communicatively coupled to one or more consoles 150 via a Console Sub-System Interface (CSSI) 155 designed to facilitate integration of consoles with the radio frequency sub-system. In addition, other network elements can be coupled to each radio frequency sub-system 120 including databases (not illustrated), data terminals (not illustrated), and gateways (not illustrated) to other networks such as the public switched telephone network (PSTN).

A communication link 155 couples the radio frequency sub-system 120-1 to other radio frequency sub-systems including SRFSS 120-2. In one implementation, the communication link 155 can be an Internet Protocol (IP) based communication link for transferring information between the radio frequency sub-systems 120. In some implementations, the physical connection between two radio frequency sub-systems 120 will either be a private IP connection, such as 4.9 GHz WiMAX, licensed microwave or fiber, or a virtual private network (VPN) connection across a common carrier.

The radio frequency sub-systems 120 are the basic network infrastructure elements in a P25 System. Each radio frequency sub-system 120 may comprise a collection of control modules that include an ISSI module 125. Each ISSI module 125 includes at least a mobility management module, a call control module, which handles call signaling, and a media control module, which deals with the forwarding and processing of media (e.g., voice) traffic. One implementation of the ISSI module 125 will be described below with reference to FIG. 2.

Each radio frequency sub-system 120 includes an ISSI module 125 that is used to implement the ISSI 160. In other words, the ISSI modules of the HRFSS 120-1 and the SRFSS 120-2 function as an interface between them. In FIG. 1, this interface is represented by ISSI 160. The ISSI 160 is an interface that supports voice services and functions, mobility services and functions, and data services and functions between two radio frequency sub-systems 120. Communications between the HRFSS 120-1 and the SRFSS 120-2 are managed via the ISSI 160. The ISSI 160 provides services and processes to accomplish its functions, as will be described below. Among the services and functions supported by the ISSI 160 are: authentication of roaming subscriber units, subscriber unit database management (e.g., tracking current location of roaming subscriber units), voice transport, P25 addressing, subscriber unit/Group call setup and teardown to support voice services (e.g., group voice services and subscriber unit to subscriber unit voice services). In addition, functions provided are for mobility management purposes include registration and tracking or roaming subscriber units, as will be described below. The detailed specification of the messages and procedures that are defined for exchange across the ISSI are contained in TIA-102.BACA-A and its addendums, which is incorporated by reference herein in their entirety.

Mobility Management Between The HRFSS and SRFSS:

When a radio frequency sub-system functions as a HRFSS 120-1, it is responsible for tracking the subscriber unit's movement or is home for a group of subscriber units. Here, the subscriber units 130-1, 130-2 have roamed from the HRFSS 120-1 to the SRFSS 120-2. When a radio frequency sub-system functions as the SRFSS 120-2, it means that the radio frequency sub-system 120-2 is serving a subscriber unit 130-1, 130-2 or a group of subscriber units that has roamed to the SRFSS 120-2. For example, in FIG. 1, subscriber units 130 are initially associated with a HRFSS 120-1. Then subscriber units 130-1, 130-2 can roam from HRFSS 120-1 to SRFSS 120-1, and using P25 protocols, register at a fixed station or site of SRFSS 120-2. As will be described below with reference to FIG. 3, the SRFSS 120-2 processes the P25 over-the-air registration and sends a SIP register message to the HRFSS 120-1. The SIP register message is received and is acknowledged by the HRFSS 120-1, which provides information back to the SRFSS 120-2 with the radio's characteristics.

The SRFSS 120-2 assigns each of the visiting subscriber units 130-1, 130-2 a temporary working subscriber unit (or "user") identification (ID). Temporary working group IDs are also assigned when a subscriber unit group affiliates with the SRFSS 120-2 using P25 over-the-air messages. Working subscriber unit IDs and working group IDs are required because the ID numbering schemes may be different on the two radio frequency sub-systems.

Figure 2:
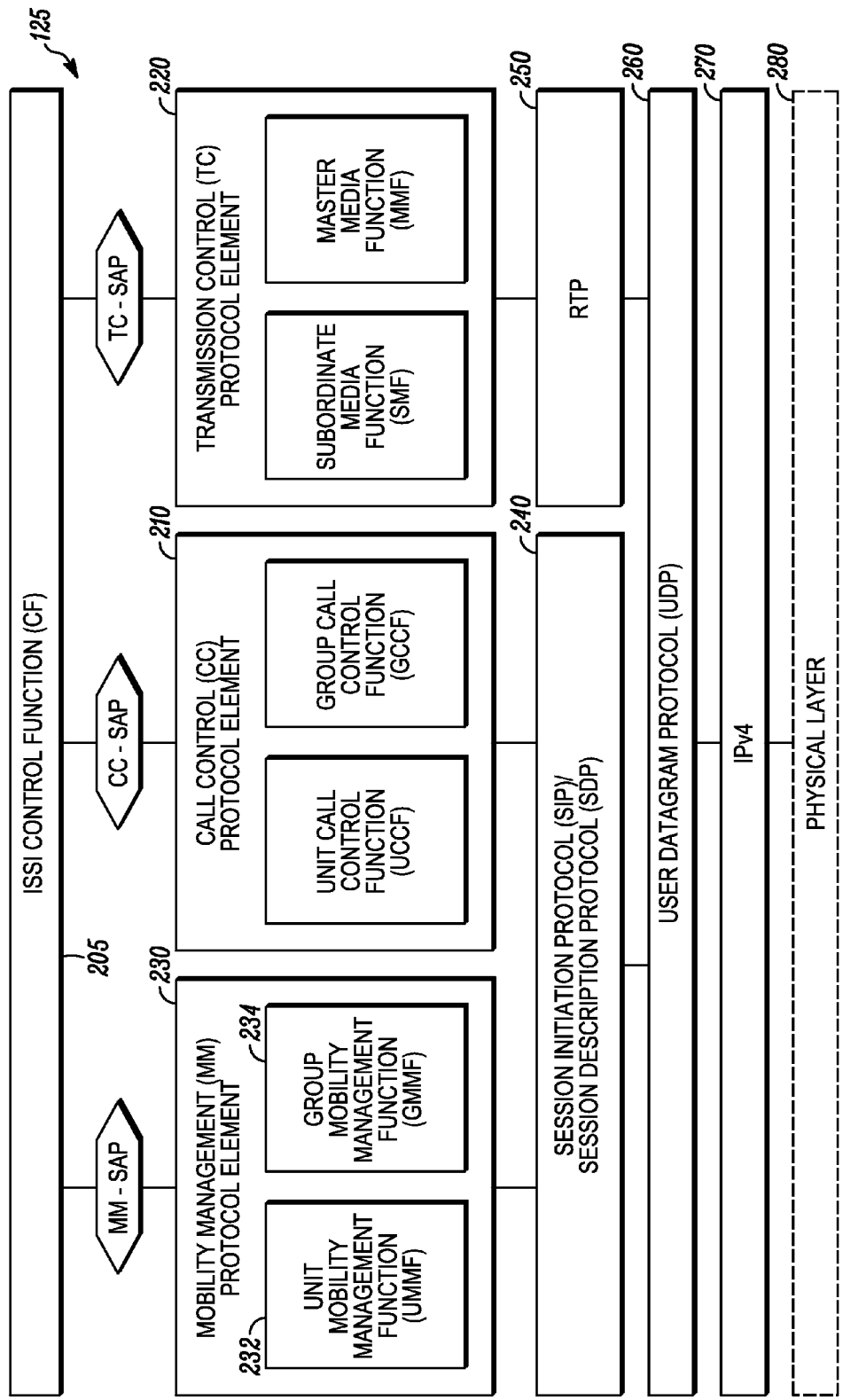
FIG. 2 illustrates a layered protocol architecture of an ISSI module that is provided at each radio frequency sub-system to implement the ISSI in accordance with one implementation.

FIG. 2 illustrates a layered protocol architecture of an ISSI module 125 that is provided at each radio frequency sub-system 120 to implement the ISSI 160 in accordance with one implementation.

In FIG. 2, the layered protocol architecture groups different functional areas together in various modules 210, 220, 230. More specifically, the layered protocol architecture 125 includes an ISSI Control Function (CF) module 205 that operates in conjunction with a Call Control (CC) processing module 210, a Transmission Control module 220, and a Mobility Management module 230. To provide services and processes to accomplish its functions, the ISSI 160 defines three functional areas: Call Control processing module 210 to control individual and group calls, Transmission Control module 220 to manage transmission of individual and group calls, and Mobility Management module 230 to perform processing to manage mobility and determine locations of subscriber units. The P25 ISSI is built on IP technologies originally developed for services such as streaming media applications across the Internet. The ISSI 160 relies on standard IP protocols for signaling using the Internet Engineering Task Force (IETF) Session Initiation Protocol (SIP) 240 and Session Definition Protocol (SDP) 240, and for voice transport using the IETF Real-time Transfer Protocol (RTP) 250. Each of the functional areas will now be briefly described.

The Call Control (CC) processing module 210 controls the Radio Frequency (RF) resources and Real-time transport Protocol (RTP) resources used for either a group call via a group call control function (GCCF) or a subscriber unit-to-subscriber unit call via a subscriber unit control function (UCCF). The Call Control (CC) processing module 210 uses SIP messages per the SIP and SDP 240 to handle or accomplish its call control tasks including call establishment (or call set-up) procedures, call maintenance procedures, and call tear-down procedures. Call control messages are transported across a user datagram protocol (UDP) 260 and Internet Protocol Version 4 (IPv4) 270 network stack. For example, referring to FIG. 1, when the visiting subscriber unit 130-1, 130-2 initiates a call with push to talk (PTT), the SRFSS 120-2 sends a SIP invite message back to the HRFSS 120-1. The HRFSS 120-1 grants the call back to the SRFSS 120-2 with a SIP OK message. A SIP acknowledgement message (referred to as a SIP 125 OK message) is sent back to the HRFSS 120-1 to finalize the call setup. Calls can be terminated by either the home or SRFSS using the SIP bye message. Typically, the HRFSS 120-1 terminates the call. It should be noted that these are simplified examples for the generic voice use case. However, many other features supported by the ISSI are performed in a similar manner.

The Transmission Control (TC) module or Protocol Element 220 controls the delivery of the voice (audio) data, and the arbitration of talk spurts for group voice calls. TC module 220 uses the RTP 250 to accomplish its tasks. For example, RTP 250 can be used to send communications from P25 talk groups bi-directionally from a HRFSS or SRFSS. Once call setup is finalized, dedicated socket ports for the RTP streams can be set up on each radio frequency sub-system, and the call is transported using these dedicated socket ports for PTT, voice packets and unkey messages. Call communications are transported across a user datagram protocol (UDP) 260 and IPv4 270 network stack.

The Mobility Management (MM) module 230 handles a subscriber unit entering and leaving the coverage or service area of a radio frequency sub-system, and allows a roaming subscriber unit to keep in contact with its HRFSS regardless of where that particular subscriber unit happens to be located. In this regard, the MM module 230 performs various procedures that allow a roaming subscriber unit to keep contact with its agency, wherever it is located. Among other things, the MM module 230 allows a subscriber unit to access services outside of its HRFSS, and for a group to be expanded outside of its HRFSS. This way, for example, a subscriber unit 130-1, 130-2 of FIG. 1 that moves outside its HRFSS 120-1 coverage area will be able to register and to affiliate with the Group it is interested in when within the radio coverage of a SRFSS 120-2 (assuming compatible radio frequencies) and will be allowed to operate according to a mutual agreement owning agencies of the subscriber unit HRFSS, the Group HRFSS and the SRFSS 120-2.

As used herein, the term "registration" refers to a process used by a SRFSS to register and authenticate a subscriber unit or to register interest in a talk group. The MM module 230 is responsible for tasks including subscriber unit registration/de-registration, group registration/de-registration, and subscriber unit mobility. As will be described with reference to FIGS. 3-6, the MM module 230 uses SIP messages per the SIP and the SDP 240 to accomplish its various registration and de-registration methods needed to handle registration for roaming subscriber units. In particular, the MM module 230 relies on the SIP REGISTER method to register and de-register subscriber units and talk groups. Registration and de-registration will be described in greater detail below with reference to FIGS. 3-6.

During registration, the radio frequency sub-system assigns each subscriber unit a Working Subscriber Unit Identifier (WSUID) and Working Talk Group Identifier (WTGID). For example, when the SRFSS 120-2 registers the visiting subscriber units 130-1, 130-2, the radio frequency sub-system will assign each a WSUID and a WTGID, which can also be referred to as the Subscriber Group ID (SGID). The WSUID and WTGID are temporary ID's assigned to the subscriber unit while in that Registration Area. The radio frequency sub-system maintains a registration database to track the assignment of WSUID and WTGID to a corresponding subscriber unit ID and talk group ID.

SU Identifiers (SUIDs) and Talk Group Identifiers (TGIDs)

Talk-group identifier (TGID): Each talk group in a radio frequency sub-system is uniquely addressable using a 16 bit talk group ID field. The talk group ID identifies the talk-group for a message. The purpose of a talk group is to allow logical groupings of radio users into distinct organizations. The talk group ID could also be used to minimize co-channel interference and allow subscriber addressing. talk group IDs are implemented in the Header Code Word and Link Control Word (LDU1). The values used for talk group IDs range from hexadecimal $0000 to $FFFF, and thus can be one of 65,536 possible addresses.

The $0001-$FFFE are used to designate assignable group addresses, which are general addresses for use in group operations. There are 65,534 unique group addresses supported for each communication system. Talk group ID values $0001 to $FFFE are assignable talk group IDs meaning that they can be assigned to a particular talk group.

Special group address values can be used for the talk group ID field. The following talk group ID's have specific functions. For example, the group address value $0001 is specified as the default talk group ID value and should be used in systems where no other talk groups are defined. The group address value $0000 is the talk group ID for a talk group with no users that is used to designate a null group address, which is a special group address to be used as a place holder in signaling formats expecting a group address, but where none actually applies for this particular application. $0000 can be used when implementing an individual call.

The group address value $FFFF is the talk group ID used to designate an all group address, which is a special group used to designate an all system call. In other words, $FFFF is reserved as a talk group which includes everyone, and is used for an "all" call. A call assignment with this all group address will be processed by all the active subscriber units on the communication system (or segment of communication system), regardless of the individual subscriber unit's current group affiliations.

Subscriber Unit Identifiers (SUID): Each subscriber unit in a radio frequency sub-system is uniquely addressable using a 24 bit subscriber unit ID field. In one embodiment, the subscriber unit ID (SUID) address field holds a 24-bit subscriber unit ID that uniquely addresses at least one subscriber unit within the system. Subscriber unit IDs are used in both group and individual calling. The subscriber unit ID can be used as both a Source ID (from the sending unit) and a Destination ID (in the receiving unit in an individual call). The subscriber unit ID is different from the Electronic Serial Number (ESN) embedded in the subscriber unit since the ESN is only programmable by the manufacturer of the radio.

The values for subscriber unit IDs range from hexadecimal $00 0000 to $FF FFFF and thus can be one of 16,777,216 potential addresses. The subscriber unit ID's should be programmed into the radios using a national, corporate or agency wide unit identification scheme that can vary. A number of special subscriber unit IDs are defined that have specific functions.

The subscriber unit ID value $00 0000 is used to identify no specific subscriber unit and serves as a place holder for the subscriber unit address. The subscriber unit ID value $00 0000 is never assigned to a subscriber unit.

SUID values $000001 through $98967F are for general use.

The subscriber unit values $00 0001-$FF FFFB are used to identify an assignable subscriber unit and serves as a valid address value for the subscriber units within a system.

SUID values $989680 to $FF FFFE are for talk group use or other special purposes.

For example, subscriber unit ID value $FF FFFD is used as a system default address for messages that are addressed to or sourced by the FNE call processing function, including operations such as registration, mobility; subscriber unit ID value $FF FFFE is a registration default address used during registration for a registration transaction prior to the subscriber unit receiving a valid subscriber unit ID (e.g., ESN registration request when no viable subscriber unit ID is available). The subscriber unit ID value $FF FFFC is reserved for Fixed Network Equipment (FNE) use, and is used for messages that are addressed to or sourced by the FNE radio control/dispatch operator function. Radio control/dispatch functions involve operations such as radio status.

SUID value $FF FFFF is a special all unit address used to identify all subscriber units (i.e., designates everyone), and can be used when implementing a group call within a talk group ID. The all unit address is referenced in the P25 specification TIA-102.AABC-C, Trunking Control Channel Messages, for sending a broadcast message out to all subscriber units for generic system information.

It is noted that the subscriber unit ID and talk group IDs both include information that allows for the identity of a HRFSS of the subscriber unit or talk group to be determined. This information can be used by another network element (e.g., a SRFSS) to perform a DNS lookup to obtain an IP address of the HRFSS, for example.

SU Registration With a Home Radio Frequency Sub-System

Figure 3:
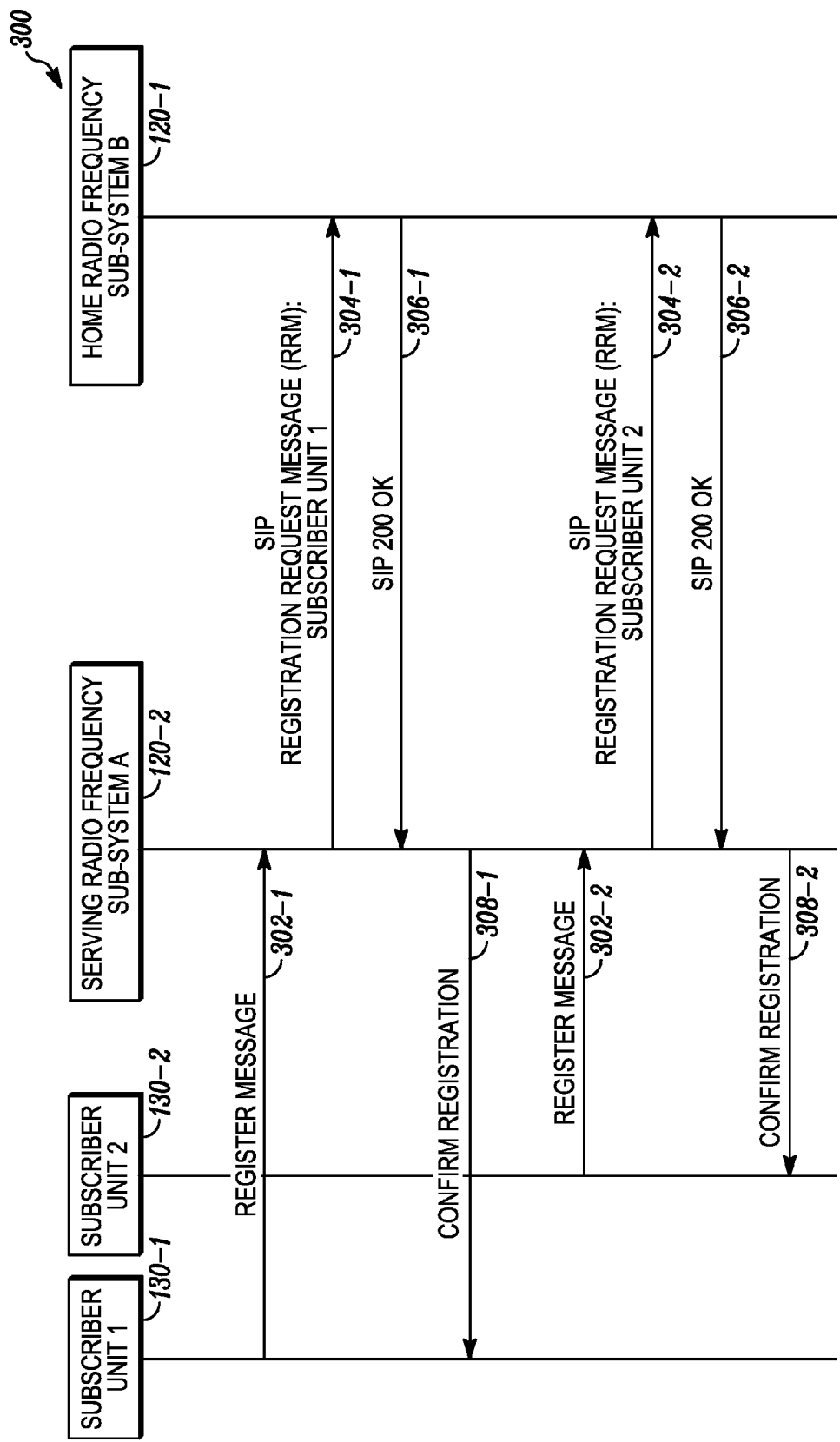
FIG. 3 is a message flow diagram that illustrates a subscriber unit (SU) registration method.

FIG. 3 is a message flow diagram that illustrates a subscriber unit (SU) registration method 300. Preliminarily, it is noted that the term "registered" is used to refer to a radio frequency sub-system that subscriber units or talk groups are currently registered with. In this context, a subscriber unit or talk group can only be registered with a single radio frequency sub-system at any given time. A subscriber unit is normally registered with its HRFSS unless it roams to a SRFSS, in which case the subscriber unit can become deregistered with its HRFSS and can become registered with the SRFSS where it is located. To do so, the HRFSS for that subscriber unit must "authorize" registration with the SRFSS. In the event the subscriber unit relocates to a new radio frequency sub-system (e.g., its HRFSS or another SRFSS), then the subscriber unit can deregister with the SRFSS where it was previously located, and register with the new radio frequency sub-system.

A subscriber unit operating in a P25 system will search for the control channel by scanning its list of pre-programmed channels that are continually broadcast by any P25-compliant radio frequency sub-systems. Once the control channel is found, the visiting subscriber units will transmit a register messages to the SRFSS 120-2. In this example, the subscriber units 130-1, 130-2 have roamed to SRFSS 120-2, and must be authorized by their HRFSS 120-1 to granted permission to register with the SRFSS 120-2. The SRFSS 120-2 request registration of subscriber units 130-1, 130-2 with HRFSS 120-1 to inform the HRFSS 120-1 of the new location of subscriber units 130-1, 130-2.

For example, as illustrated in FIG. 3, when a subscriber unit 130-1, 130-2 enters the coverage (serving) area of a SRFSS 120-2, the subscriber unit 130-1, 130-2 will send a register message 302 to register at a site of the SRFSS 120-2. The SRFSS 120-2 will determine the HRFSS 120-1 of the subscriber unit 130-1, 130-2 from information provided in the register messages 302, and send a SIP registration request message 304 to the HRFSS 120-1 to register the subscriber unit's location to its HRFSS 120-1. The SIP registration request message 304 includes a subscriber unit ID for that subscriber unit, the SRFSS location of the subscriber unit, and possibly other registration information for that subscriber unit. The HRFSS 120-1 uses the location information (e.g., that subscriber units 130-1, 130-2 are located in SRFSS 120-2) in case it needs to forward an incoming call to the subscriber units 130-1, 130-2. The SRFSS 120-2 will know which fixed station the subscriber units 130-1, 130-2 are associated with.

The SRFSS 120-2 can register each subscriber unit 130-1, 130-2 individually. For example, with reference to FIG. 3, the SRFSS 120-2 notifies the HRFSS 120-1 of the current location of a subscriber unit 130-1 or 130-2 that have roamed within its serving area by sending separate SIP register messages 304-1, 304-2. It is the task of a HRFSS 120-1 to track the movement and location of a subscriber unit 130-1 or 130-2 by using notifications from SRFSSs 120-2 or by actively polling for the subscriber unit's current location.

In response to the SIP registration request message 304, the HRFSS 120-1 updates its location information for the subscriber units 130-1, 130-2 in its registration database, and accepts/grants the subscriber unit registration at the SRFSS 120-2 by sending a SIP 125 OK message 306 to the SRFSS 120-2. This way, when the HRFSS 120-1 receives a call to the roaming subscriber units 130-1, 130-2, the HRFSS 120-1 knows the locations of the subscriber units 130-1, 130-2, and can forward the call to SRFSS 120-2.

The SRFSS 120-2 then sends a registration confirmation message 308 to the subscriber units 130-1, 130-2 to confirm that HRFSS 120-1 has registered them with SRFSS 120-2, and that SRFSS 120-2 has granted the subscriber units 130-1, 130-2 access. The registration confirmation message 308 can include a Working Unit ID (WUID) and/or a Working Group ID (WGID) that are assigned to the subscriber units 130-1, 130-2 by the SRFSS 120-2. At this point, the subscriber units 130-1, 130-2 are allowed to communicate with their HRFSS 120-1 via the SRFSS 120-2.

Talk Group Registration With a Home Radio Frequency Sub-System

The talk group registration method is similar; however, the SRFSS 120-2 only needs to register one talk group affiliation with the HRFSS 120-1 for the first subscriber unit that is affiliated with a particular talk group. Any subsequent subscriber units that belong to that same talk group will automatically be registered at the HRFSS 120-1.

Figure 4:
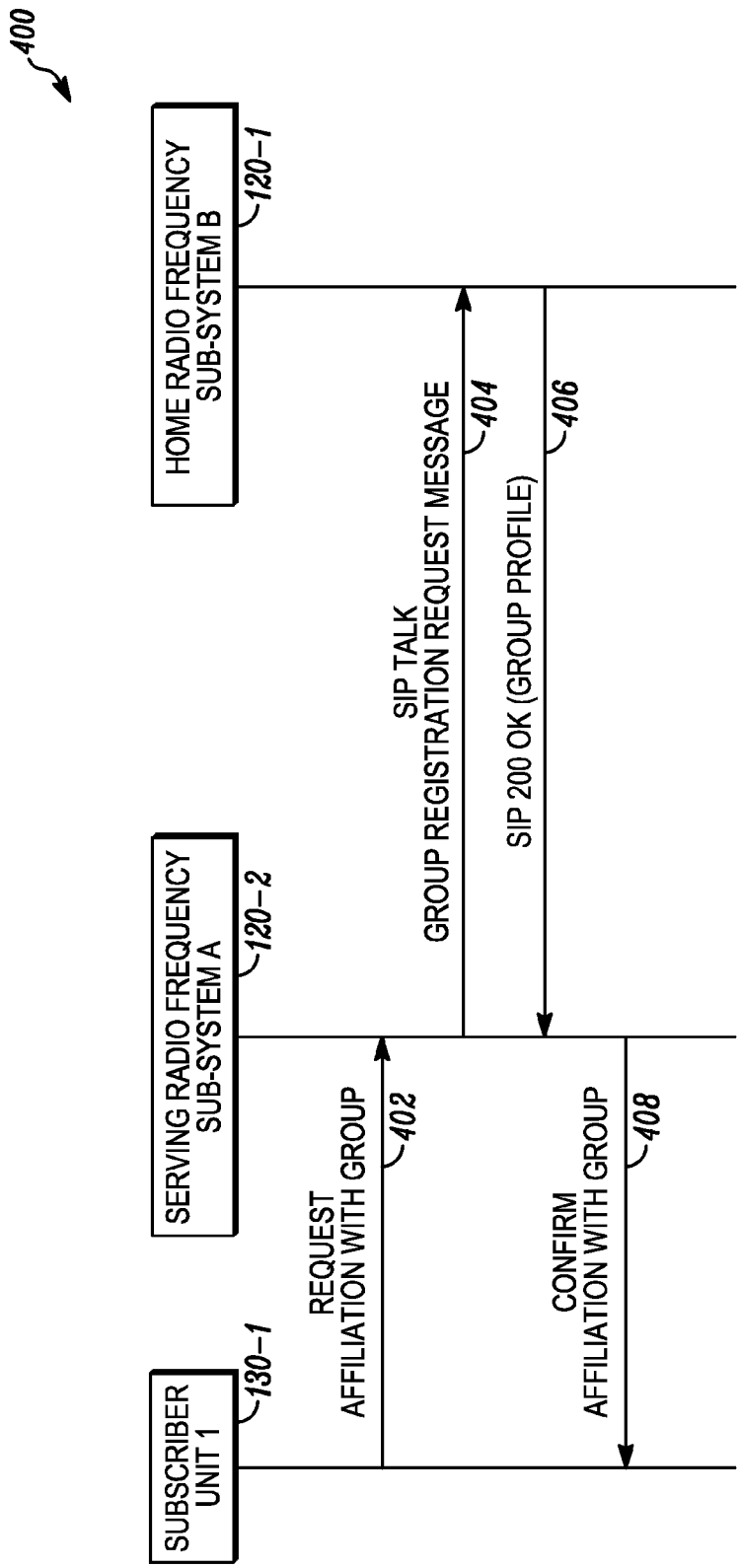
FIG. 4 is a message flow diagram that illustrates a talk group (TG) registration method.

FIG. 4 is a message flow diagram that illustrates a talk group (TG) registration method 400. If the subscriber unit 130-1 wants to affiliate with a particular talk group, the SRFSS 120-2 also informs the HRFSS 120-1 of its interest in that particular talk group by registering to that particular talk group. When a subscriber unit 130-1 at the SRFSS 120-2 indicates that it would like join that particular talk group, the serving radio frequency sub-system 120-2 will register the subscriber unit 130-1 with the HRFSS 120-1 indicating that there are one or more subscriber units 130-1 at its location joining that particular talk group. A SIP REGISTER message can be used to accomplish this registration process.

For example, as illustrated in FIG. 4, when a subscriber unit 130-1 requests affiliation with a particular talk group and the SRFSS 120-2 has not previously registered to that particular talk group, the subscriber unit 130-1 will send a group affiliation request message 402 to a site of the SRFSS 120-2.

Based on message 402, the SRFSS 120-2 will determine the HRFSS 120-1 of that particular talk group, and send a SIP register message 404 to the HRFSS 120-1 to expand that particular talk group to the SRFSS 120-2.

In response to the SIP register message 404, the HRFSS 120-1 updates its location information for that particular talk group, and accepts the group affiliation of the SRFSS 120-2 by sending a SIP 125 OK message 406 to the SRFSS 120-2.

The HRFSS 120-1 of that particular talk group updates its databases so when the need to connect a call to those roaming subscriber units of that particular talk group occurs, the HRFSS 120-1 knows where members of that particular talk group are located.

The SRFSS 120-2 then sends a group affiliation confirmation message 408 to the subscriber unit to confirm affiliation of the subscriber unit 130-1 with that particular talk group.

SU De-Registration of a Serving Radio Frequency Sub-System

Figure 5:
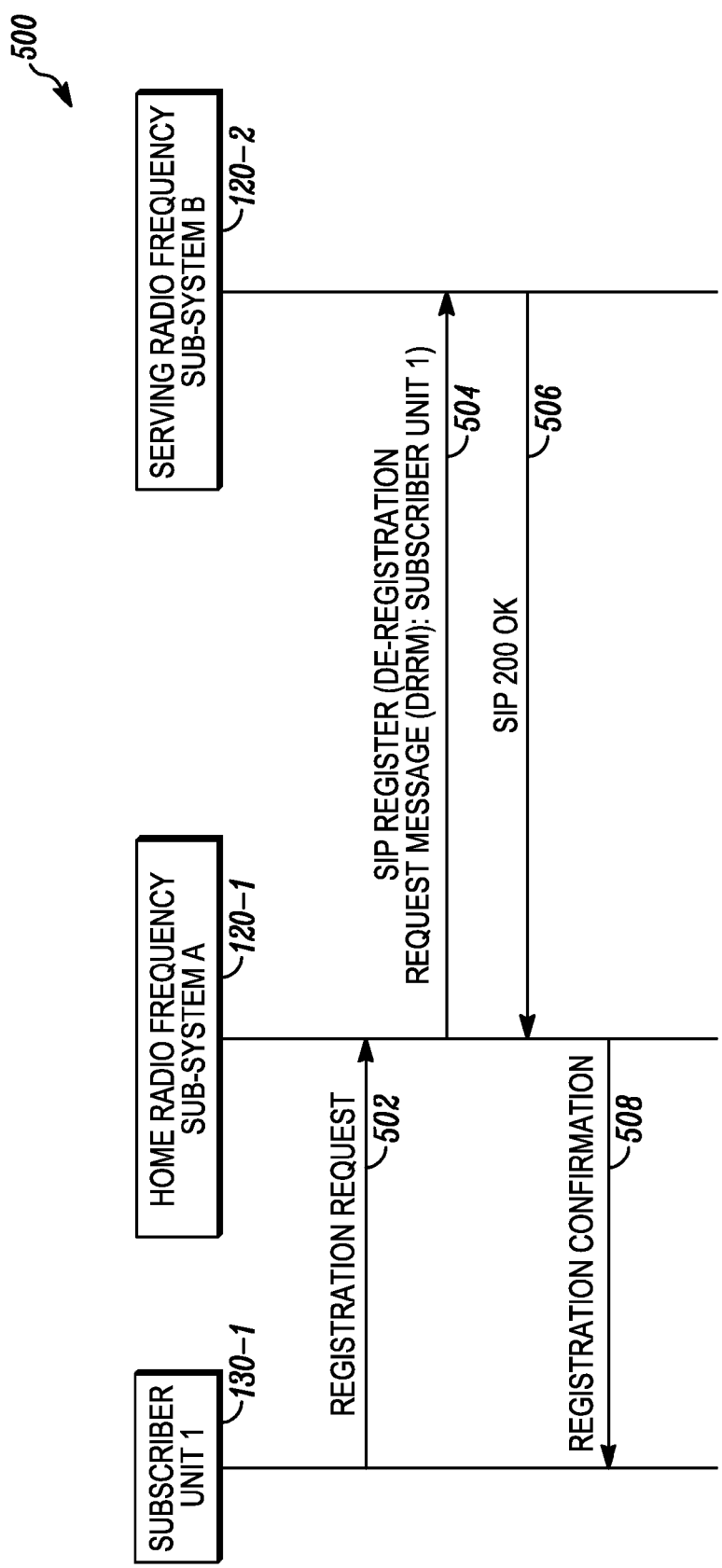
FIG. 5 is a message flow diagram that illustrates a subscriber unit (SU) de-registration method.

FIG. 5 is a message flow diagram that illustrates a subscriber unit de-registration method 500. As used herein, the term "deregistration" refers to a process initiated by a SRFSS to remove interest in a subscriber unit or a talk group.

When the subscriber unit 130-1 that was previously located in the SRFSS 120-2 enters a coverage (serving) area of the new radio frequency sub-system, which can be the HRFSS 120-1 or another radio frequency sub-system, the subscriber unit 130-1 registers in the HRFSS 120-1 using a protocol similar to that described above with reference to FIG. 3.

The HRFSS 120-1 deregisters with the subscriber unit's previously SRFSS 120-2 by sending a SIP REGISTER message 502 indicating deregistration to the previous SRFSS 120-2 to deregister the subscriber unit 130-1 in that radio frequency sub-system.

When the previously SRFSS 120-2 receives this new SIP REGISTER message 502 it deletes its mobility information for that subscriber unit 130-1, and accepts de-registration by sending a SIP 125 OK message 504 to the HRFSS 120-1.

Group De-Registration of a Serving Radio Frequency Sub-System

Figure 6:
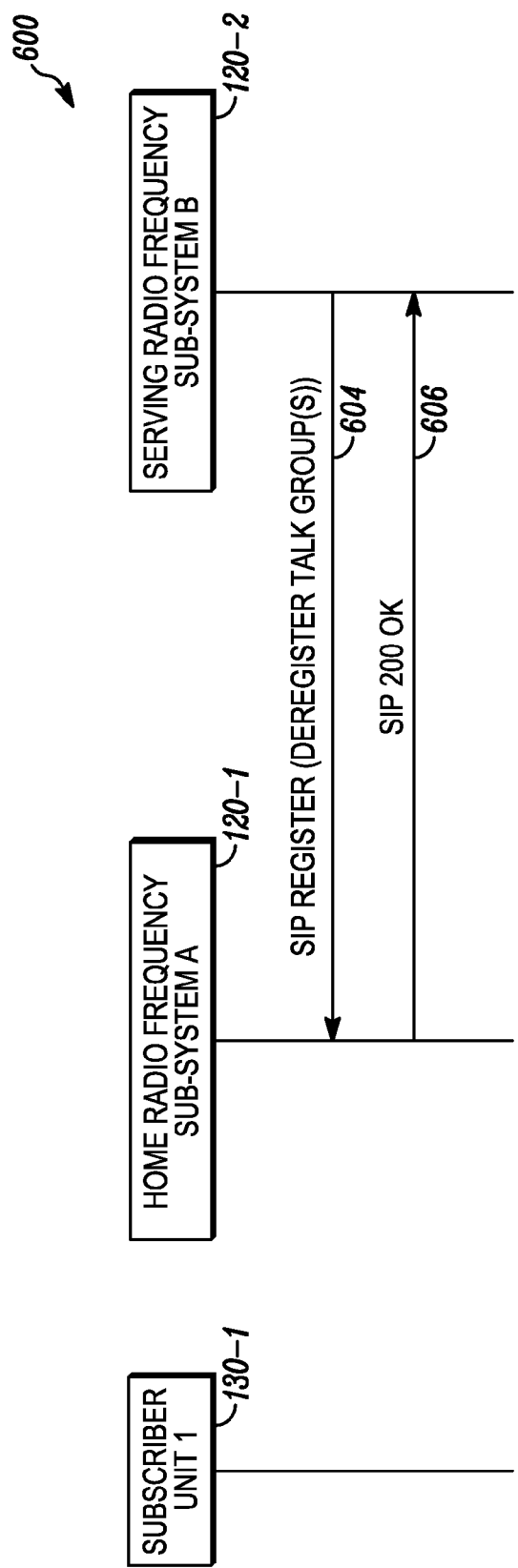
FIG. 6 is a message flow diagram that illustrates a group de-registration method.

FIG. 6 is a message flow diagram that illustrates a group de-registration method 600.

When a SRFSS 120-2 determines that it is no longer interested in a particular talk group, the SRFSS 120-2 sends a SIP REGISTER message 604 indicating to the HRFSS that it would like to deregister with that particular talk group.

When the HRFSS 120-1 receives this SIP REGISTER message 604, the HRFSS 120-1 updates its location information for the Group to de-register the SRFSS 120-2 with respect to that particular talk group, and sends a SIP 125 OK message 606 to the SRFSS 120-2.

In response to the SIP 125 OK message 606, the SRFSS 120-2 deletes its mobility information for that particular talk group.

Having described basic subscriber unit/TG registration and de-registration methods, particular implementations of some of the disclosed embodiments will now be described with reference to FIGS. 7A through 8B. In accordance with the disclosed embodiments, when a HRFSS fails for some reason and loses subscriber unit and talk group registration information in its registration database, methods, systems and apparatus are provided for recovering such registration information. The disclosed methods, systems and apparatus allow a HRFSS to obtain registration information for all subscriber units or all talk groups from SRFSS(s) that they are currently registered with by transmitting a single system-wide request message (e.g., a registration query message or a de-registration request message) to the SRFSS(s). This request message triggers re-registration of subscriber units with the HRFSS so that a registration database at the HRFSS can be restored. This way the HRFSS can continue to forward calls to or from its "roamed" subscriber units that are located at a different SRFSS.

Figure 7A:
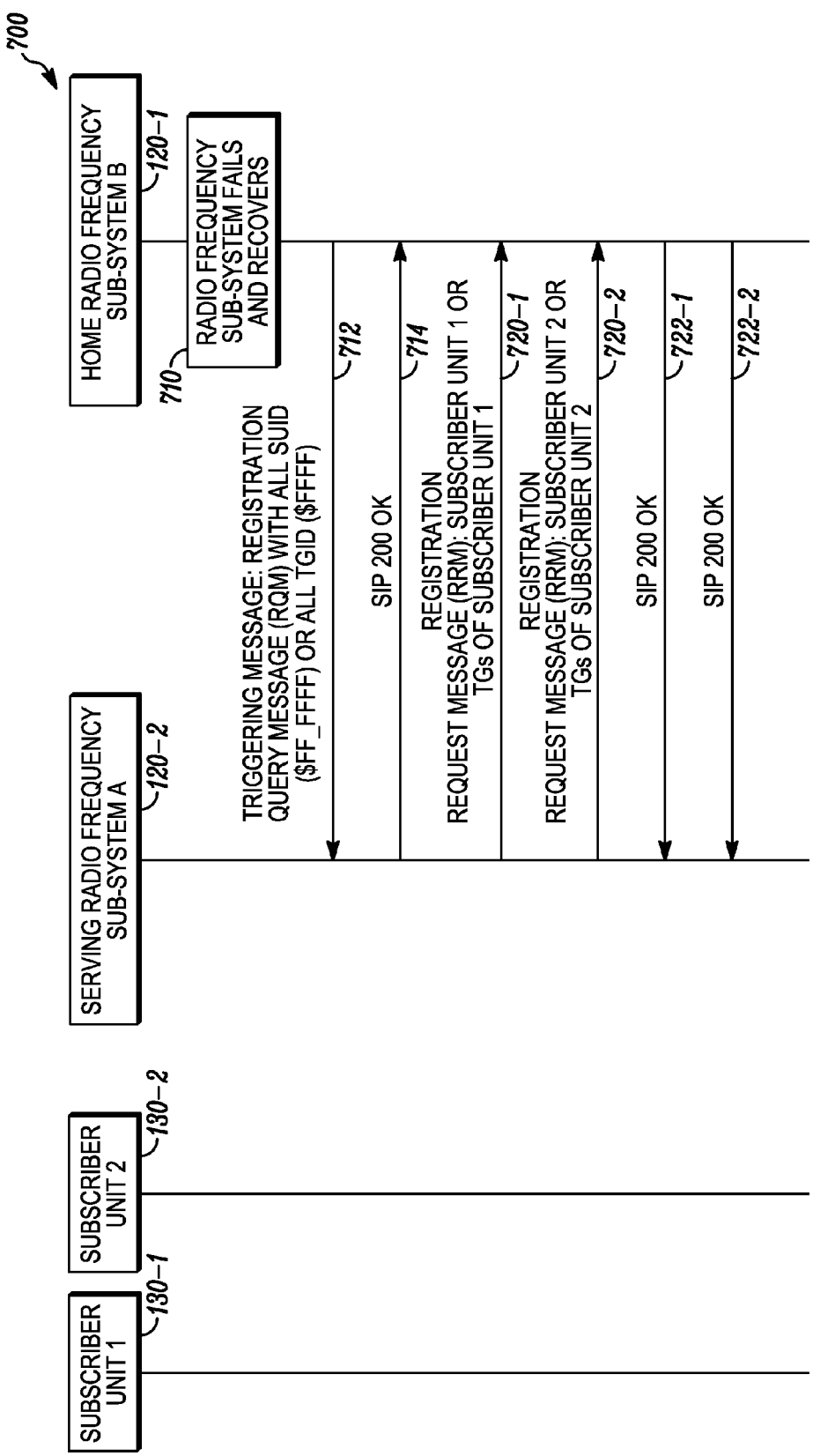
FIG. 7A is a message flow diagram that illustrates a registration information recovery method for recovering registration information at a home radio frequency sub-system (HRFSS) in accordance with some embodiments.

FIG. 7A is a message flow diagram that illustrates a registration information recovery method 700 for recovering registration information at a HRFSS in accordance with some embodiments. Depending on the implementation of method 700, the registration information that is recovered can correspond to either subscriber unit IDs for subscriber units that are "homed" to HRFSS 120-1 or talk group IDs for talk groups that subscriber units 130-1, 130-2, which are "homed" to HRFSS 120-1, belong to or are members of.

At block 710, the HRFSS 120-1 determines that it will initiate the registration information recovery method 700 after the HRFSS 120-1 has experienced loss of the registration information maintained in its registration database. The registration information includes subscriber unit IDs and/or talk group IDs associated with subscriber units that have roamed from their HRFSS 120-1 to SRFSS 120-2 and registered with that SRFSS 120-2 so that they are authorized to communicate with their HRFSS 120-1.

At communication 712, the HRFSS 120-1 begins the registration information recovery method 700 by communicating a registration query message (RQM) to at least one SRFSS 120-2. The RQM is a triggering message that triggers the SRFSS 120-2 to provide registration information for each subscriber unit and/or talk group that has roamed to the SRFSS 120-2 and is associated with the HRFSS 120-1 as its "home" network. The RQM allows the HRFSS 120-1 to ask the SRFSS(s) if subscriber units/talk groups are registered.

In one implementation of communication 712, the RQM specifies a special all subscriber unit ID used to identify all subscriber units that are located at and registered with the SFRSS 120-2. This way, the HRFSS 120-1 can request that the SRFSS 120-2 provide registration information for all subscriber units that are associated with and have roamed from the HFRSS 120-1 to SRFSS 120-2. In one implementation, the all subscriber unit ID has a hexadecimal value of $FF FFFF.

In another implementation of communication 712, the RQM specifies a special all talk group ID used to designate an all system call and to identify all subscriber units at SRFSS 120-2 regardless of the individual subscriber unit's current talk group affiliations. This way, the HRFSS 120-1 can effectively query all talk groups at the SRFSS 120-2 and request that the SRFSS 120-2 provide HRFSS 120-1 with all talk group IDs that are associated with the HRFSS 120-1. In one implementation, the all talk group ID has a hexadecimal value of $FFFF.

At communication 714, the SRFSS 120-2 responds to the RQM with a SIP 125 OK message to acknowledge or accept the RQM for all subscriber units and/or all talk groups.

In accordance with the embodiments of FIG. 7A, the SRFSS 120-2 can read registration information from a database, and then communicate one or more registration request message(s) 720 to the HRFSS 120-1. The one or more registration request message(s) 720 allow the HRFSS 120-1 to obtain a list of all subscriber unit IDs and/or all talk group IDs that are authorized to be registered with SRFSS 120-2 by HRFSS 120-1. The registration information provided via the registration request message(s) 720 can include a subscriber unit ID for each subscriber unit, and/or a talk group ID for each talk group that is registered at the SRFSS 120-2 by HRFSS 120-1. The registration request message(s) 720 can also include other information such as a source address that indicates that its from the SRFSS 120-2, etc.

For example, in one implementation, the SRFSS 120-2 may determine which ones of its registered subscriber units or talk groups are associated with (or "homed to") the HRFSS 120-1, and can then communicate a single registration request message 720 that includes a list of all subscriber unit IDs and/or all talk group IDs that are associated with (or "homed to") the HRFSS 120-1, and are therefore to be authorized at the HRFSS 120-1 for registration with the SRFSS 120-2.

In another implementation, the SRFSS 120-2 may determine which ones of the subscriber units or talk groups are associated with the HRFSS 120-1, and can then communicate separate registration request messages 720-1, 720-2 corresponding to each subscriber unit and/or each talk group that is determined to be associated with the HRFSS 120-1. Based on these registration request messages 720-1, 720-2, the HRFSS 120-1 can determine that it had previously authorized registration of those subscriber units/talk groups with the SRFSS 120-2.

In another implementation, the SRFSS 120-2 may communicate registration request message(s) 720 that include all subscriber units or all talk groups located at and registered with the SRFSS 120-2. The HRFSS 120-1 can then determine which ones of these subscriber units or talk groups are associated with the HRFSS 120-1. Here again, the SRFSS 120-2 can communicate either a single registration request message 720 that includes all subscriber units or all talk groups located at and registered with the SRFSS 120-2, or separate registration request messages corresponding to each subscriber unit and/or each talk group having a subscriber unit located at and registered with the SRFSS 120-2.

At communication(s) 722, the HRFSS 120-1 responds to the registration request message(s) received at communication 720 with one or more SIP 125 OK message(s) to indicate that registration of subscriber units/talk groups with SRFSS 120-2 was authorized at or allowed. For example, when separate communications 720-1, 720-2 are used for each subscriber unit or talk group, then separate SIP 125 OK messages can be communicated at communications 722-1, 722-2. By contrast, when a single registration request message 720 is used for all subscriber units and/or talk groups, then a single SIP 125 OK message can be communicated by HRFSS 120-1, which indicates the subscriber unit IDs and talk group IDs that were authorized for registration at the SRFSS 120-2.

Although the method 700 can be effective in many situations, in other situations, the information maintained in a registration database of the SRFSS 120-2 may not be complete or up-to-date. For example, a subscriber unit that was previously registered with SRFSS 120-2 might not still be registered with the SRFSS 120-2 when HRFSS 120-1 sends the RQM, in which case it is preferred to require that all subscriber units re-register with HRFSS 120-1. For instance, subscriber units that were previously registered with SRFSS 120-2 may no longer be authorized to be registered. This can happen, for example, when the registration lifetime (i.e., the time the registration is valid) for a subscriber unit expires, in which case, the subscriber unit will have to re-register with the SRFSS 120-2 to continue to be authorized to communicate with HRFSS 120-1.

Figure 7B:
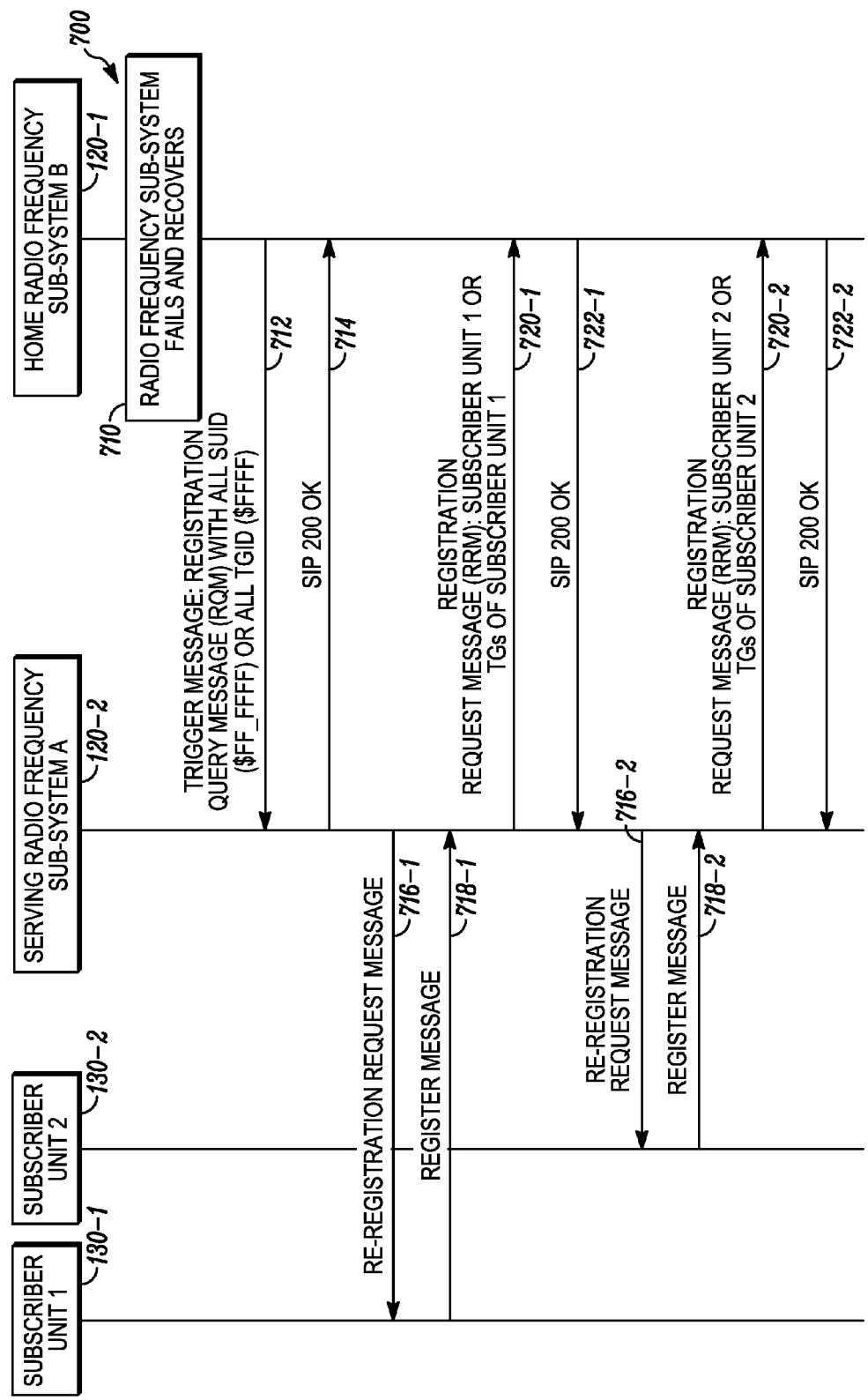
FIG. 7B is a message flow diagram that illustrates a registration information recovery method for recovering registration information at a home radio frequency sub-system (HRFSS) in accordance with some embodiments.

FIG. 7B is a message flow diagram that illustrates a registration information recovery method 750 for recovering registration information at a HRFSS in accordance with some embodiments. These embodiments are similar to those in FIG. 7A in that block 710, communication 712, communication 714, communication(s) 720 and communication(s) 722 can be identical to those described above with reference to FIG. 7A. However, in accordance with method 750, communications 716-1, 716-2, 718-1, 718-2 can be used to ensure that all registrations with SRFSS 120-2 are up-to-date before communicating registration request message(s) 720 from SRFSS 120-2.

For example, in one embodiment, at communications 716-1, 716-2, in response to the RQM, the SRFSS 120-2 communicates re-registration request messages (RRRMs) to all subscriber units located within communication range to command those subscriber units to re-register themselves (and/or their respective talk groups that they are affiliated to) with the SRFSS 120-2.

In other embodiments, prior to sending communications 716-1, 716-2 in response to the RQM, the SRFSS 120-2 can determine a sub-set of all subscriber units that are associated with the HRFSS 120-1 based on information SRFSS 120-2 had stored during prior registration of subscriber units/talk groups that are associated with or "homed to" HRFSS 120-1. The HRFSS 120-1 can then selectively communicate unicast re-registration request messages (RRRMs) to that sub-set of all subscriber units to command the sub-set of subscriber units to re-register themselves and/or re-register the talk groups that they are affiliated with.

At communications 718-1, 718-2, each subscriber unit that receives a RRRM can respond with a register message. Depending on the implementation each register message can include either (1) registration information for the subscriber unit including a subscriber unit ID for the subscriber unit, and/or (2) registration information for one or more talk group (s) that the subscriber unit belongs to (i.e., talk group registration information) including talk group ID(s) for those talk group(s). The register messages 718 can also include other information including capability information regarding whether the subscriber unit/TG is capable of transmitting and/or receiving voice information and/or data information, the site location of the subscriber unit within the SRFSS 120-2, etc.

Although not illustrated in FIG. 7B, in some embodiments where the communications 716 are sent to all subscriber units located at SRFSS 120-2, the SRFSS 120-2 can determine which subscriber units are associated with the HRFSS 120-1 (i.e., determine which of the responding subscriber units are relevant) by sorting/filtering the register messages 718 it receives. In some embodiments, the subscriber unit ID can be used to determine the HRFSS 120-1 for the subscriber unit. For instance, in some implementations, the subscriber unit ID can be used by the SRFSS 120-2 to perform a DNS look-up to determine the HRFSS for the subscriber unit. In other embodiments, a range of subscriber unit IDs can defined such that they correspond to a particular HRFSS. Similarly, the SRFSS 120-2 can also determine which talk groups are associated with the HRFSS 120-1 (i.e., determine which of the re-registered talk groups are relevant) by sorting/filtering the register messages 718 it receives. In some embodiments, a talk group ID can be used to determine the HRFSS 120-1 for the subscriber unit. For instance, in some implementations, the talk group ID can be used by the SRFSS 120-2 to perform a DNS look-up to determine the HRFSS that corresponds to that talk group ID. In other implementations, a range of talk group IDs can be defined such that they correspond to a particular HRFSS.

At communication(s) 720, the SRFSS 120-2 then communicates the one or more registration request messages (RRMs) to the HRFSS 120-1. Each registration request message 720 can include relevant registration information for each of the subscriber units and/or talk groups (that are determined to be associated with the HRFSS 120-1). As above, this registration information can include subscriber unit IDs and/or talk group IDs.

In some implementations of method 750, the SRFSS 120-2 sends a registration request message for each subscriber unit that responds with a register message 718-1, 718-2 via separate communications 720-1, 720-2 that correspond to each subscriber unit. For instance, in one implementation, at communication 720-1, the SRFSS 120-2 sends HRFSS 120-1 a registration request message including a subscriber unit ID for subscriber unit 1 130-1, and at communication 720-2, the SRFSS 120-2 sends HRFSS 120-1 a registration request message including a subscriber unit ID for subscriber unit 2 130-2. By contrast, in other implementations, at communication 720-1, the SRFSS 120-2 sends HRFSS 120-1 a registration request message including talk group IDs for talk groups that subscriber unit 1 130-1 is affiliated with, and at communication 720-2, the SRFSS 120-2 sends HRFSS 120-1 a registration request message including talk group IDs for talk groups that subscriber unit 2 130-2 is affiliated with. In still other implementations, registration request messages 720 can include both the subscriber unit ID and its corresponding talk group IDs for the subscriber unit. Moreover, the registration request messages 720-1, 720-2 can also include other information as described above.

In other implementations, the SRFSS 120-2 can send a single RRM that includes registration information for all subscriber units/talk groups that are associated with the HRFSS 120-1.

The HRFSS 120-1 can then determine, based on the registration request messages 720, whether to authorize registration of the subscriber units and/or talk groups with SRFSS 120-2. For subscriber units and/or talk groups it decided to authorize, the HRFSS 120-1 can then communicate one or more SIP 125 OK messages 722 to the SRFSS 120-2 to confirm that registration of those subscriber units and/or talk groups with the SRFSS 120-2 has been authorized by the HRFSS 120-1. As above, this can be done using either a single SIP 125 OK message 722, or one SIP 125 OK message 722-1, 722-2 for each subscriber unit/TG that was authorized.

The HRFSS 120-1 can then use the subscriber unit/TG registration information for the authorized subscriber units/talk groups to restore or recover the subscriber unit/TG registration information that was lost.

Figure 8:
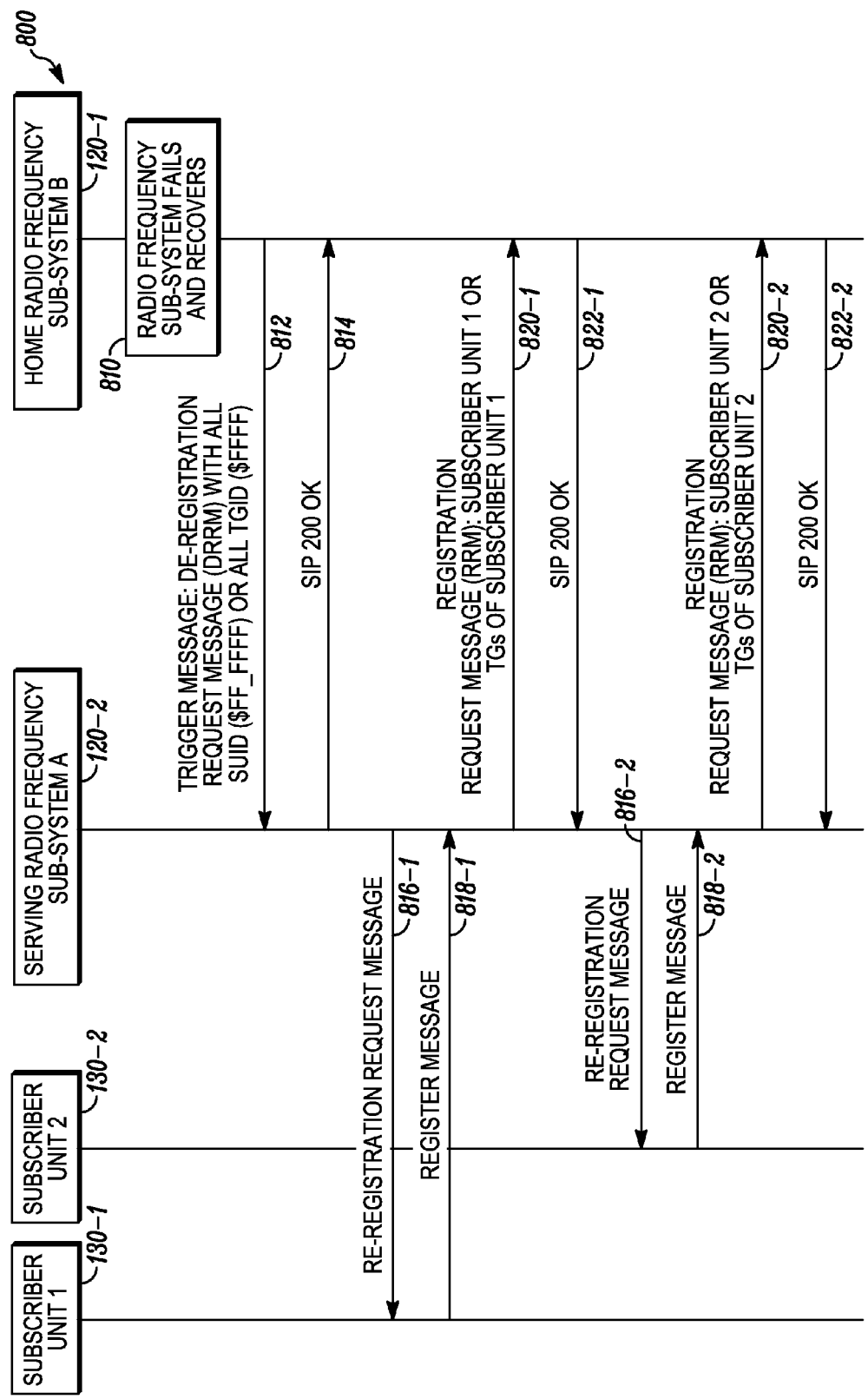
FIG. 8 is a message flow diagram that illustrates a registration information recovery method for recovering registration information at a home radio frequency sub-system (HRFSS) in accordance with some embodiments.

FIG. 8 is a message flow diagram that illustrates a registration information recovery method 800 for recovering registration information at a HRFSS in accordance with some embodiments. These embodiments are similar to those in FIGS. 7A and 7B in that block 810 is similar to block 710, the communication(s) at 820 are similar to those described with reference to communication(s) 720, and the communication(s) at 822 are similar to those described with reference to communication(s) 722 and can be identical to those described above with reference to FIG. 7B. In addition, in a similar manner to FIG. 7B, communications 816-1, 816-2, 818-1, 818-2 can be used to ensure that all registrations with SRFSS 120-2 are up-to-date before communicating registration request message(s) 820 from SRFSS 120-2.

However, in accordance with method 800, communications 812, 814 differ from communications 712, 714 of FIGS. 7A and 7B.

In these alternative embodiments, at communication 812, the HRFSS 120-1 begins the registration information recovery method 800 by communicating a de-registration request message (DRRM) to at least one SRFSS 120-2. The DRRM is a triggering message that triggers the SRFSS 120-2 to provide registration information for each subscriber unit and/or talk group that has roamed to the SRFSS 120-2 and is associated with the HRFSS 120-1 as its "home" network.

The DRMM communicated at 812 allows HRFSS 120-1 to inform SRFSS 120-2 that all subscriber units and/or all talk groups associated with HRFSS 120-1 are no longer to be registered with SRFSS 120-2. This way the HRFSS 120-1 indicates to the SRFSS 120-2 that HRFSS 120-1 no longer knows the status of any subscriber units/talk groups that were registered with SRFSS 120-2, and that with respect to any subscriber units/talk groups that are to remain registered at SRFSS 120-2, those subscriber units should be de-registered and required to re-register.

Behavior of the SRFSS 120-2 also varies in the embodiments of FIG. 8. Although not shown in FIG. 8, upon receiving the DRMM, the SRFSS 120-2 performs de-registration processing to de-register at least all subscriber units and talk groups associated with HRFSS 120-1.

In some implementations, SRFSS 120-2 can either accept or decline the DRMM. When the SRFSS 120-2 is still interested in registering subscriber unit(s) and/or talk group(s) with HRFSS 120-1, SRFSS 120-2 can re-register those subscriber unit(s) and/or talk group(s) with HRFSS 120-1.

In some other implementations, the interest of the SRFSS 120-2 is dictated by the presence of subscriber units within its location area, and when subscriber units are present within its location area registration of those subscriber unit(s) and/or talk group(s) with SRFSS 120-2 can be required.

In some implementations of communication 812, the DRRM specifies a special all subscriber unit ID used to identify all subscriber units that are located at and registered with the SFRSS 120-2. This way, the HRFSS 120-1 can request that the SRFSS 120-2 provide registration information for all subscriber units that are associated with and have roamed from the HFRSS 120-1 to SRFSS 120-2. As above, in one implementation, the all subscriber unit ID has a hexadecimal value of $FF FFFF. This allows the HRFSS 120-1 to request that the SRFSS 120-2 de-register all subscriber unit IDs that it has registered including those that are authorized by HRFSS 120-1.

In other implementations of communication 812, the DRRM specifies a special all talk group ID used to designate an all system call and to identify all subscriber units located at SRFSS 120-2. This way, the HRFSS 120-1 can effectively query all talk groups at the SRFSS 120-2 and request that the SRFSS 120-2 provide HRFSS 120-1 with at least all of the talk group IDs that are associated with the HRFSS 120-1. As noted above, in one implementation, the all talk group ID has a hexadecimal value of $FFFF. The special all talk group ID address is used to designate an all system call and to identify all subscriber units in the system regardless of the individual subscriber unit's current group affiliations. A DRRM with this all group address will be processed by all the active subscriber units in the communication system. This way, the HRFSS 120-1 can request that the SRFSS 120-2 de-register all talk group IDs that it has registered.

In response to the DRRM, the SRFSS 120-2 de-registers each of its subscriber units and/or talk groups and may communicate re-registration request messages 816 to all subscriber units (located within communication range of its FSs) to command those subscriber units to re-register their subscriber unit IDs or talk group ID affiliations with the SRFSS 120-2. This way the SRFSS 120-2 can deregister all subscriber units and then re-register them to determine which ones of the subscriber units that are associated with the HRFSS 120-1 are still registered with the SRFSS 120-1.

In some implementations, where all subscriber unit IDs or all talk group IDs are sent a RRRM at 816, the SRFSS 120-2 can then determines which subscriber units/talk groups are associated with the HRFSS 120-1 (i.e., determine which of the re-registered subscriber unit IDs/talk groupIDs are relevant) by sorting/filtering the registration responses it receives, and then communicates the subscriber unit/TG registration information for each of the relevant subscriber units/talk groups (that are determined to be associated with the HRFSS 120-1) to the HRFSS 120-1. The HRFSS 120-1 can then use the subscriber unit/TG registration information provided from the SRFSS 120-2 to restore or recover the talk group registration information that was lost.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, although the disclosed embodiments describe re-registration and de-registration of "objects" that include subscriber units and talk groups, the disclosed embodiments can also be implemented in conjunction with other "objects" that use a registration procedure to notify the HRFSS of the SRFSS's interest in the object. These objects are sometimes referred to as supplementary data and include services such as emergency alarm and radio inhibit. For example, the de-registration methods described above can also be applied to any of the following objects, which include, but are not limited to: fixed network equipment (FNE) subscriber unit supplementary data, talk group supplementary data, FNE talk group supplementary data, monitoring interest in subscriber unit supplementary data, monitoring interest in talk group supplementary data, and monitoring interest in FNE talk group supplementary data.

Although the disclosed embodiments are described in the context of an ISSI protocol, those skilled in the art will appreciate that the disclosed embodiments can be implemented in other types of networks. The disclosed embodiments can be useful in conjunction with applications that implement an "all subscriber unit" or an "all talk group" identification and addressing scheme, where there are multiple subscriber units that can roam among different points of attachment (e.g., servers, gateways, etc.) in interconnected networks, and where there may be a potential need to restore information at one of the points of attachment in the event such information is lost. Examples of such applications would include systems that implement Session Initiation Protocol (SIP)-based signaling protocols to control multimedia communication sessions such as voice and video calls over Internet Protocol (IP). Examples of other possible applications include video conferencing, streaming multimedia distribution, instant messaging, presence information, file transfer and online gaming.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for recovering registration information at a home network, the method comprising:
   communicating, from the home network, a triggering message to a visited network to initiate registration information recovery;
   determining, at the visited network in response to the triggering message, a sub-set of subscriber units are associated with the home network;
   communicating, from the visited network in response to the triggering message, re-registration request messages to the sub-set of subscriber units, wherein each of the re-registration request messages commands a particular one of the sub-set of subscriber units to re-register with the visited network and comprises either: a subscriber unit identifier for that particular subscriber unit, or one or more talk group identifiers for talk groups that the particular subscriber unit is affiliated with;
   receiving, in response to the communicating the re-registration request messages, register messages from each of the sub-set of subscriber units, wherein each register message comprises registration information including either: a subscriber unit identifier for a particular subscriber unit or talk group identifiers for each talk group that the particular subscriber unit belongs to;
   communicating, from the visited network, one or more registration request message(s) to the home network, wherein the registration request messages are generated based on the register messages that were received from the sub-set of subscriber units, wherein each registration request message includes the registration information that comprises either a subscriber unit identifier corresponding to a particular one of the sub-set of subscriber units, or one or more talk group identifiers that correspond to a particular one of the sub-set of subscriber units; and
   restoring the registration information at the home network based on the registration information provided in the one or more registration request message(s).

2. A method according to claim 1, wherein the triggering message comprises:
   an all subscriber unit identifier used to identify all subscriber units that are associated with the home network, that are located at the visited network, and that are registered with the visited network.

3. A method according to claim 1, wherein the triggering message comprises:
   an all talk group identifier used to identify all talk groups that are associated with the home network, located at the visited network and registered with the visited network.

4. A method according to claim 1, wherein the home network communicates the triggering message when the home network determines that the home network has experienced loss of the registration information,
   wherein the triggering message indicates that the home network is requesting that the visited network provide registration information for all subscriber units that have roamed to the visited network from the home network and are associated with the home network.

5. A method according to claim 1, wherein the registration information corresponds to either:
   subscriber unit identifiers for subscriber units that have roamed from the home network to the visited network and registered with the visited network, or
   talk group identifiers for talk groups that the subscriber units belong to or are members of so that the subscriber units are authorized to communicate with their home network.

6. A method according to claim 1, wherein
   the one or more talk group identifiers comprise talk group identifiers for each talk group that is registered at the visited network by home network for the particular subscriber unit.

7. A method according to claim 6, further comprising:
   determining the registration information from a database maintained at the visited network.

8. A method according to claim 7, wherein the step of determining the registration information from a database maintained at the visited network, comprises:
   determining, at the visited network, which ones of the subscriber units or talk groups are associated with the home network and registered with the visited network; and
   determining the registration information from the database maintained at the visited network for each of the subscriber units or talk groups that are determined to be registered with the visited network.

9. A method according to claim 8, wherein the step of communicating, in response to the triggering message, registration information, comprises:

communicating from the visited network to the home network, in response to the triggering message, a single registration request message that includes registration information for all subscriber units or all talk groups, wherein the registration information corresponds to all subscriber units or all talk groups located at the visited network that are associated with the home network and authorized by the home network for registration with the visited network.

10. A method according to claim 9, wherein the single registration request message includes either:
subscriber unit identifiers for all subscriber units located at the visited network that are associated with the home network and authorized for registration with the visited network by the home network, or
talk group identifiers for all talk groups that are associated with the home network and authorized for registration with the visited network by the home network.

11. A method according to claim 8, wherein the step of communicating, from the visited network to the home network in response to the triggering message, registration information, comprises:
communicating from the visited network to the home network, in response to the triggering message, a registration request message for each subscriber unit that is determined to be associated with the home network, wherein each registration request message corresponds to a particular subscriber unit and includes registration information for that particular subscriber unit or all talk groups that the particular subscriber unit is affiliated with, and wherein each particular subscriber unit is located at the visited network, associated with the home network, and authorized for registration with the visited network by the home network,
wherein each registration request message includes registration information for a particular subscriber unit or talk groups that the particular subscriber unit is associated with.

12. A method according to claim 11, further comprising:
determining at the home network, based on registration information provided in the registration request messages, which ones of these subscriber units or talk groups are associated with the home network.

13. A method according to claim 1, further comprising:
ensuring that the registration information at visited network is up-to-date before communicating the registration information from visited network to the home network.

14. A method for recovering registration information, the method comprising:
receiving, from the home network at a visited network, a triggering message to initiate registration information recovery;
communicating, from the visited network to the home network and in response to the triggering message, registration information for subscriber units that are located at the visited network and that are associated with the home network;
wherein communicating registration information for the subscriber units comprises:
determining, at the visited network, the subscriber units; and
communicating, from the visited network in response to the triggering message, re-registration request messages that correspond to the subscriber units, wherein each of the re-registration request messages commands a particular subscriber unit of the subscriber units to re-register, either:
a subscriber unit identifier for that particular subscriber unit; or
talk group identifiers for talk groups that the particular subscriber unit is affiliated with.

15. A method according to claim 1, wherein the triggering message is a registration query message (RQM) that triggers the visited network to provide registration information for each subscriber unit and/or talk group that has roamed to the visited network and is associated with the home network.

16. A method according to claim 1, wherein the triggering message is a de-registration request message that triggers the visited network to provide registration information for each subscriber unit and/or talk group that has roamed to the visited network and is associated with the home network.

17. A method according to claim 16, further comprising:
upon receiving the de-registration request message at the visited network, de-registering all subscriber units and talk groups associated with home network; and
re-registering at least some of subscriber unit identifiers for the de-registered subscriber units or talk group identifiers for the de-registered talk groups with home network.

18. A radio frequency subsystem (RFSS) network element capable of operating in a visited network when coupled to a home network, the RFSS network element comprising:
a processing device that is configured to implement a mobility management module that is, in turn, configured to, when operating in the visited network:
receive, from the home network, a triggering message to initiate registration information recovery;
determine, at the visited network in response to the triggering message, a sub-set of subscriber units that are associated with the home network and that have roamed to the visited network;
communicate, from the visited network in response to the triggering message, re-registration request messages to the sub-set of subscriber units, wherein each of the re-registration request messages commands a particular one of the sub-set of subscriber units to re-register with the visited network and comprises either: a subscriber unit identifier for that particular subscriber unit or one or more talk group identifiers for talk groups that the particular subscriber unit is affiliated with;
receive, in response to the re-registration request messages, register messages from each of the sub-set of subscriber units, wherein each register message comprises registration information including either: a subscriber unit identifier for a particular subscriber unit or talk group identifiers for each talk group that the particular subscriber unit belongs to;
communicate, from the visited network, one or more registration request message(s) to the home network, wherein the registration request messages are generated based on the register messages that were received from the sub-set of subscriber units, wherein each registration request message includes the registration information that comprises either a subscriber unit identifier corresponding to a particular one of the sub-set of subscriber units, or one or more talk group identifiers that correspond to a particular one of the sub-set of subscriber units.

19. A radio frequency subsystem (RFSS) network element capable of operating in a visited network when coupled to a home network, the RFSS network element comprising:

a processing device that is configured to implement a mobility management module that is, in turn, configured to, when operating in the visited network:
  receive, from the home network, a triggering message to initiate registration information recovery
  communicate, to the home network in response to the triggering message, registration information for subscriber units that are located at the visited network and that are associated with the home network, wherein the registration information comprises: identifiers for the subscriber units or identifiers for talk groups that are registered at the visited network and that are associated with the home network;
  wherein communicating registration information for the subscriber units comprises:
    determining, at the visited network, the subscriber units; and
    communicating, from the visited network in response to the triggering message, re-registration request messages that correspond to the subscriber units, wherein each of the re-registration request messages commands a particular subscriber unit of the subscriber units to re-register, either:
    a subscriber unit identifier for that particular subscriber unit; or
    talk group identifiers for talk groups that the particular subscriber unit is affiliated with.

* * * * *